Sept. 8, 1953 H. P. LUHN 2,651,461

RECORD SENSING AND DATA STORAGE DEVICE

Filed Dec. 31, 1951 5 Sheets-Sheet 1

INVENTOR
HANS P. LUHN
BY Harry T. Berriman
AGENT

RECORD SENSING AND DATA STORAGE DEVICE

Filed Dec. 31, 1951 5 Sheets-Sheet 2

INVENTOR
HANS P. LUHN
BY Harry T. Bearman
AGENT

Sept. 8, 1953 H. P. LUHN 2,651,461

RECORD SENSING AND DATA STORAGE DEVICE

Filed Dec. 31, 1951 5 Sheets-Sheet 3

INVENTOR
HANS P. LUHN
BY Harry T. Burriman
AGENT

RECORD SENSING AND DATA STORAGE DEVICE

Filed Dec. 31, 1951 5 Sheets-Sheet 4

INVENTOR
HANS P. LUHN
BY Harry T. Berriman
AGENT

Sept. 8, 1953 H. P. LUHN 2,651,461

RECORD SENSING AND DATA STORAGE DEVICE

Filed Dec. 31, 1951 5 Sheets-Sheet 5

INVENTOR
HANS P. LUHN
BY
Harry T. Berriman
AGENT

Patented Sept. 8, 1953 2,651,461

UNITED STATES PATENT OFFICE 2,651,461

RECORD SENSING AND DATA STORAGE DEVICE

Hans P. Luhn, Armonk, N. Y., assignor to International Business Machines Corporation, New York, N. Y., a corporation of New York Application December 31, 1951, Serial No. 264,330

15 Claims. (Cl. 235—61.11)

This invention relates to perforated record sensing devices, and more particularly to a pin sensing device wherein the sense pins are latched after a sensing operation in a position representative of the perforated data in the record, thus storing the record data after the sensed record is ejected from the sense position or station.

A preferred embodiment of the invention may comprise a suitable mechanism to advance each record laterally to a sense position whereafter the record is brought to rest by engaging a cyclically operable gate mechanism. The record cards utilized are conventional IBM cards adapted to receive perforations which are rectangular in shape and are arranged in the conventional manner of 80 vertical columns and twelve horizontal rows or index points. Supported by a stationary frame and arranged above the sense position of a record may be 80 sense units, one for each column of the record card. Movably mounted on the frame and adapted for vertical reciprocation relative thereto is a carrier having six bails. Each bail has an upper and lower ledge projecting from each of its sides, there being twelve upper and twelve lower ledges in all. Each sense unit includes twelve slidably mounted sense pins electrically insulated from each other and spaced to coincide with the index positions of the related column of the record card. Each sense pin includes a hooked upper end which engages either a related upper or lower ledge of one of the previously mentioned bails when the carrier is positioned in an extreme upward or normal position on the stationary frame, thus latching the pin to the bail. When the carrier occupies this extreme upward position, the lower ends of the latched sense pins are poised above the plane of records passing through or in the sense position.

To initiate a sense operation, a control magnet is energized so that it permits the carrier and associated bails to move downwardly towards a stationary record card in the sense position. The sense pins, which are continuously biased downwardly by spring action, follow the downward movement of the related bails. As a result, the sense pins are moved against the perforated record and each pin assumes either of two positions relative to the related bail dependent on whether or not a perforation is sensed. Thereafter, the carrier is moved upwardly and those sense pins which engaged perforations are latched on the corresponding lower ledge of their related bails while the remainder of the pins are latched on the corresponding upper ledge of their related bails. The latching of a sense pin on the lower ledge of a bail is determined electrically by the completion of a circuit through that sense pin to the corresponding lower ledge which serves as a circuit common. The sense pins remain latched on the corresponding lower or upper ledges of their related bails, as the case may be, until the next sensing operation and thus, serve to store or retain the perforated data information of the previously sensed record card after it is ejected from the sense position.

An object of the invention is to provide a static card sensing device of the pin type wherein the sense pins are of small mass and especially adapted for high speed sensing of perforated record cards.

Another object of the invention is to provide a static card sensing device of the pin type wherein the sense pins are latched in either of two possible positions after engaging a record card dependent upon whether a perforation or nonperforation was sensed, the latched pins thus storing or retaining a representation of the data in the card until the next sense operation takes place.

Another object of the invention is to provide a card sensing device of the pin type and having novel means of moving the sense pins into engagement with a record card in order to effect a sense operation.

Another object of the invention is to provide a static card sensing device of the pin type wherein the pins are latched in either of two possible positions after engaging a record card and being removed therefrom dependent upon whether a perforation or nonperforation was sensed, and wherein an electrical circuit may be completed through each of the latched sense pins which previously sensed a perforation, thereby controlling machine functions in accordance with the perforated data on the record card.

Another object of the invention is to provide a static card sensing device of the pin type wherein, although the sense pins are very rapidly engaged with and then disengeged from a record card to effect sensing with only momentary interruption of the movement of the record card, the pins are latched for a time appreciably greater than the actual sense period, in a position representative of the card perforations, thus giving adequate time for the electrical operation of relatively slow acting work devices through the latched pins as circuit elements.

Another object of the invention is to provide a static card sensing device of the pin type wherein the sense pins are arranged in groups, each group being carried in an easily removable unit thus permitting rapid servicing of the device.

Figure 2:
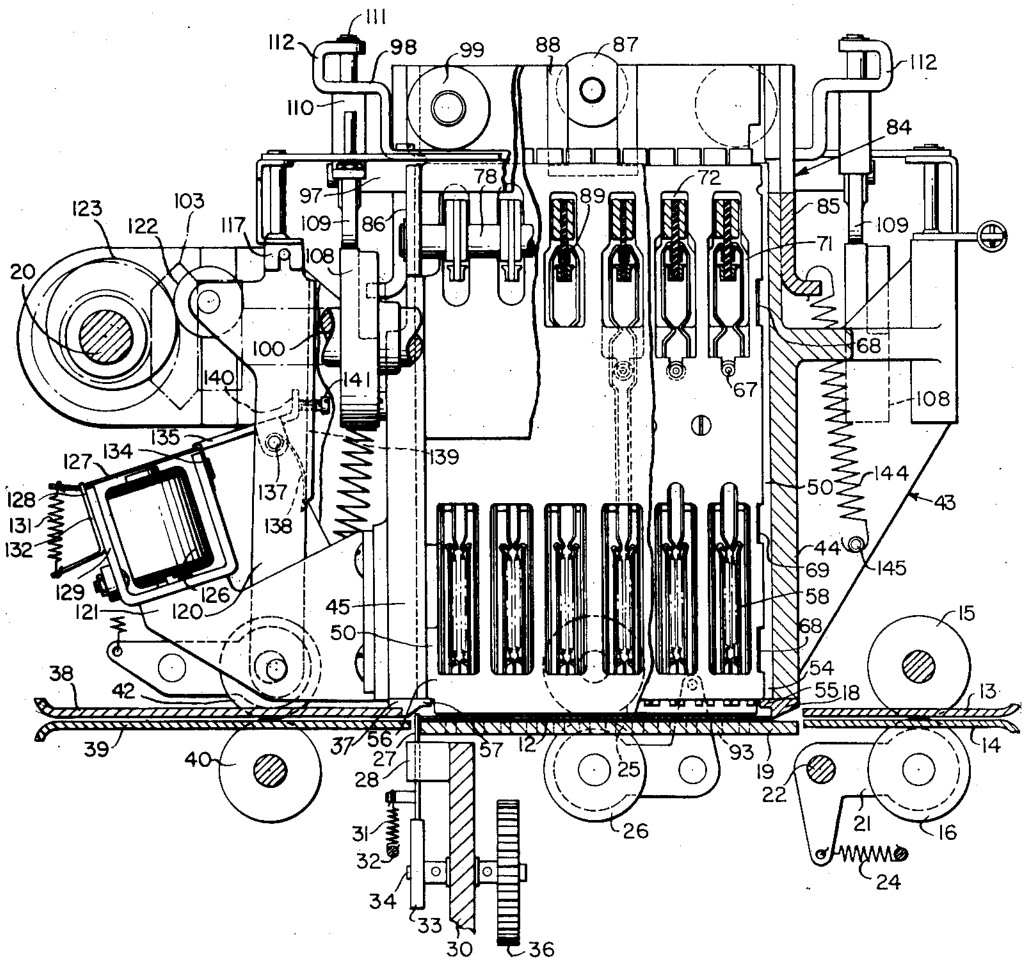
Fig. 2 is a vertical sectional view of the sensing and storage device taken on the plane of the line 2—2 of Fig. 1 with parts of the mechanism broken away to facilitate illustration.

Referring to Fig. 2, there is shown not only the record sensing and storage device, but also the necessary mechanism to advance each record 12 into a sense position as indicated, bring the record to a full stop at the sense position in order that the record sense operation may take place, and thereafter discharge the sensed record from the sense position. The record cards are advanced singly in any well known manner between the guide plates 13 and 14. Thereafter, feed rollers 15 and 16, which extend into the card path through suitable openings in the guide plates 13 and 14, grip the card and advance it between a throat member 18 and a record support member 19. The roller 15 is secured to a shaft which is positively driven clockwise in Fig. 2 by suitable gearing (not shown) linked to a main power shaft 20, the latter being continuously rotated by any suitable drive means (not shown). The roller 16 is mounted on one end of a bellcrank 21 which is pivotally mounted on a fixed shaft 22. A spring 24 acting on the other end of the bellcrank urges the roller 16 in a counterclockwise direction in Fig. 2 relative to the shaft 22 so as to press the record card against the positively driven roller 15.

Figure 1:
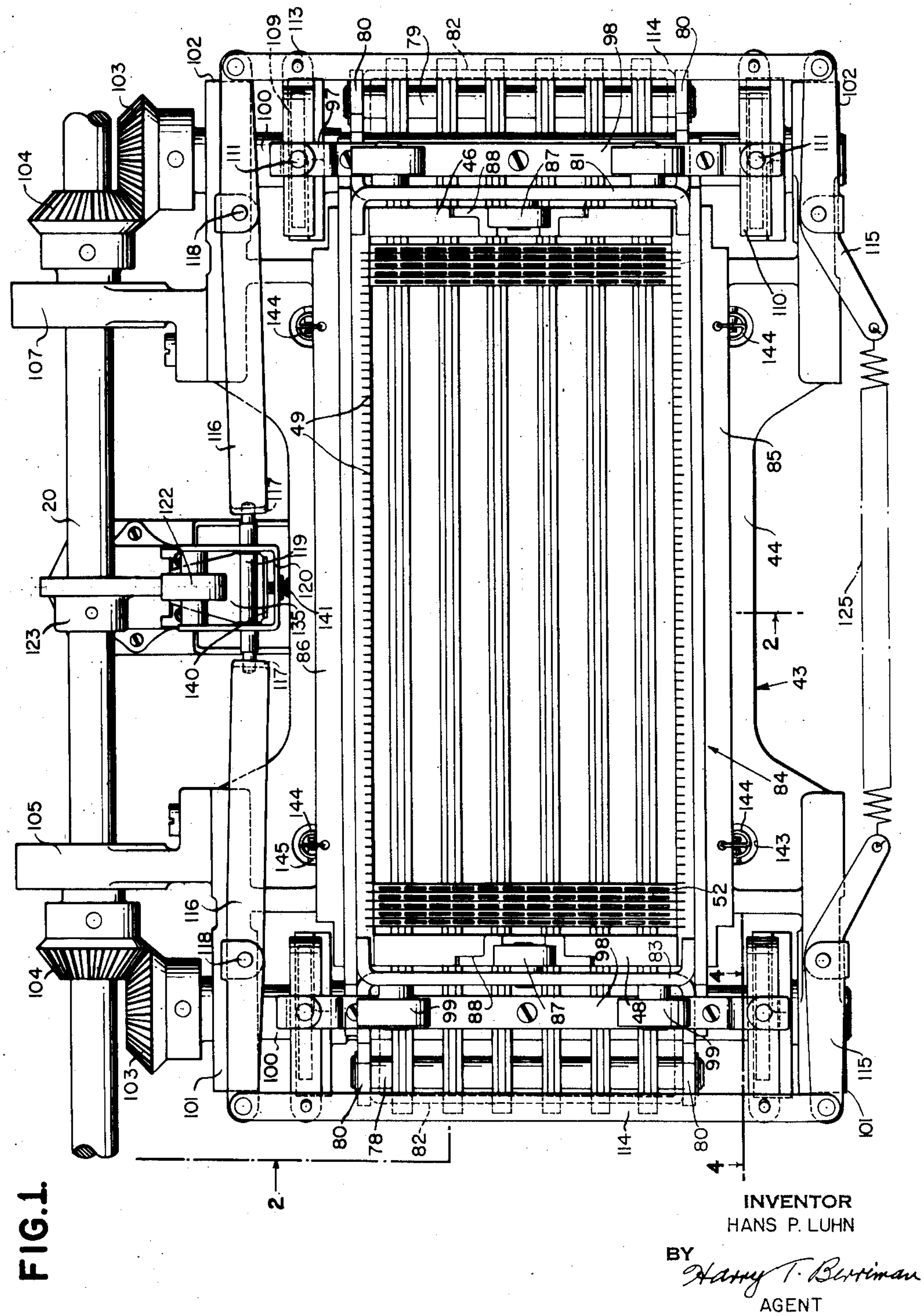
Fig. 1 is a plan view of the sensing and storage device and shows the bail carrier operating mechanism in a latched position.

As the trailing edge of each record moves between the rollers 15 and 16, the leading edge of the record is gripped by two pairs of intermediate rollers, such as the pair 25 and 26 shown in Fig. 1, which continue the advance of the record. The intermediate rollers grip the records along their side edges and do not extend over the actual perforated record area of the card. The roller 25, like roller 15, is positively driven clockwise by suitable gearing (not shown) linking it to the power shaft 20, while the roller 26 is spring biased so as to press the record against the continually rotating roller 25. The two pairs of intermediate rollers continue the advance of the record until its leading edge engages a gate 27 which brings the record 12 to a stop in the sense position, as indicated in Fig. 1. As long as the gate occupies the position indicated, the driven roller of each pair of intermediate rollers slides on the surface of the record, thus keeping the record registered at the gate.

The gate 27 is slidably mounted in a guide block 28 secured to a stationary plate 30. A spring 31 acting between the gate and a fixed stud 32 continually biases the gate downwardly in Fig. 2 so as to maintain its lower edge engaging a cam 33 secured to a shaft 34. The shaft is journalled in plate 30 and is continuously rotated through the medium of a gear 36 secured to the other end of the shaft and operatively linked by gearing (not shown) to the power shaft 20.

After the sense operation is performed on the record, a low dwell of the cam 33 moves into engagement with the gate so that the upper portion of the gate moves downwardly out of the path of the record. With the gate 27 no longer engaging the leading edge of the record, the intermediate rollers advance the record from the sense position through the throat 37 and between guide plates 38 and 39. As the trailing edge of the record moves out of engagement with the intermediate rollers, a positively driven roller 40 and a spring biased roller 42, both extending through suitable openings in the guide plates 39 and 38, respectively, continue the advance of the record.

Referring to Figs. 1 and 2, the actual sense and storage device itself comprises a stationary frame, generally designated 43 and including a front member 44, a rear member 45 and end members 46 and 48 rigidly secured to and separating the front and rear members. It will be noted in Figs. 1 and 2 that the inner faces of the frame members 44, 45, 46 and 48 form a rectangle slightly smaller than the total area of a record card. Cut in the inner face of each of the members 44 and 45 of the frame are eighty spaced vertical slots 49. The corresponding slots 49 of each of the frame members 44 and 45 are directly opposite each other, each pair of slots being adapted to receive the extending edges 50 of a plate 51 of a sense unit 52. In this manner, the sense units 52, one for each columnar position of the record, are maintained positively aligned with the corresponding column of a record card positioned in the sense position. A step portion 54 in the forward edge of the plate 51 of each sense unit engages an extension 55 of the previously mentioned throat 18 which is secured to the frame member 44. Similarly, a step portion 56 on the rearward edge of the plate engages an extension 57 of the previously mentioned throat 37 which is secured to the frame member 45. As a result, the bottom edge of the plate 51 of each sense unit is accurately maintained slightly above the feed path of the record cards.

Figure 8:
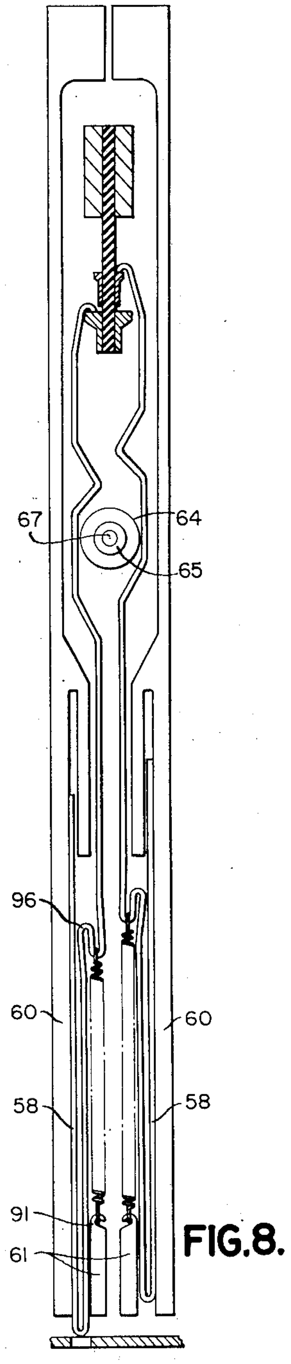
Fig. 8 is a view of the mechanism of Fig. 6 with portions broken away to facilitate illustration and shows the latched position of the sense pins after the sense operation.

Each sense unit includes 12 individual wire sense pins 58 spaced so as to coincide with the 12 individual index points of the record card, there being 80 sense units × 12 sense pins per units or 960 sense pins for sensing the entire record card. The 12 index points of the record cards are designated as the "12," "11," "0," "1," "2," "3," "4," "5," "6," "7," "8," and "9" index points. Each sense pin 58 is positioned between and slidably engages guides 60 (see Fig. 8) and 61, the lower end of the sense pin extending between the related guides as indicated in Fig. 8. Each sense pin and its related guide 60 is formed of an electrically conductive material for a purpose that will be later evident. Bonded to each side of the guides 60 and 61 is a layer of insulating material 62 which maintains and supports the guides in their proper positions. There is also provided for each pair of adjacent sense pins 58 of a sense unit, a bushing 63 formed of an insulating material and positioned between the sense pins as indicated in Figs. 2, 6, 7, and 8. The bushing comprises an enlarged circular cam portion 64 which is positioned in the plane of the related sense pins 58, while portions 65 of reduced diameter extend from the sides thereof and into mounting slots in the two layers of insulating material 62.

Each "sandwich" comprising the 12 sensing pins and related parts, and the layers of insulating material 62, is accurately positioned on one of the previously mentioned plates 51 by the engagement of flanges 68 on the plate with mating recesses 69 cut in the insulating members 62. The bushings 63 are accurately positioned and retained by plates 51 by pins 67 extending from one side of the plate into openings at the center of each of the bushings. It will be noted in Figs. 2, 6, 7, and 8 that there is an opening 71 through that part of each of the plates 51 and the insulating material 62 surrounding the top ends of each of the "pairs" of sense pins of a sense unit. The corresponding openings 71 of adjacent sense members are aligned with each other, and extending through each group of these aligned openings of the 80 sense units is a bail 72.

Each bail includes member 73 formed of an insulating material and secured between metal strips 74 at its upper portion. The strips 74 serve only to impart strength and rigidity to the member 73. Secured to and extending outwardly from each side of the lower portion of the member 73 of each bail is an upper ledge member 75 and a lower ledge member 76, the ledges being formed of a conductive material. By reason of the insulating member 73, the four ledges of each bail, two upper and two lower, are electrically insulated from each other. It will be noted that the lower ledges of each bail extend outwardly beyond their related upper ledges. Extending through aligned holes in the ends of the bails are centering rods 78 and 79, the ends of which are supported in the extensions 80 of end plates 81 and 83 of a bail carrier generally designated 84. The bails are maintained accurately spaced from each other by the engagement of their ends with suitable openings in brackets 82 which are secured to the extensions 80.

The bail carrier 84 comprises a front plate 85, a rear plate 86, and the previously mentioned end plates 81 and 83 which are rigidly secured to and separate the front and rear plates. Rotatably mounted on the inner side of each of the end plates 81 and 83 is a roller 87 which is engageable with a vertically extending channel insert 88 secured to each of the end members 46 and 48 of the stationary frame 43, thus movably mounting the carrier on the frame. Referring to Fig. 2, it will be noted that the front and rear members 44 and 45 of the frame 43 are partially cut away at their top ends and serve as a sliding surface for the front and rear plates 85 and 86 of the carrier. Mechanism to be later described is provided to effect a vertical reciprocation of the carrier relative to the stationary frame and the associated sense units 52.

Figure 6:
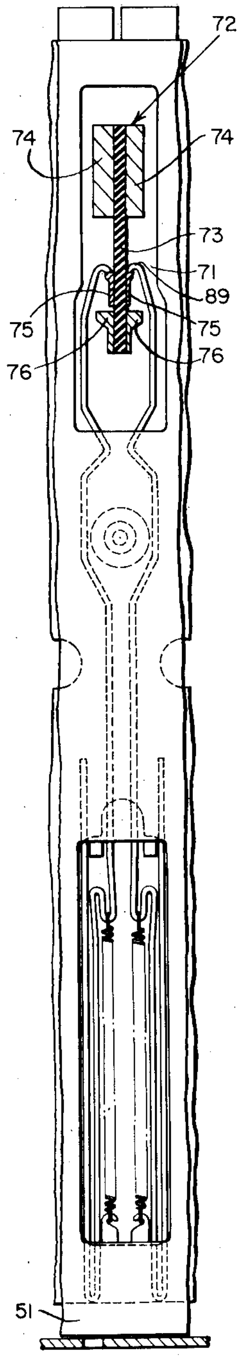
Fig. 6 is a front view of a portion of one of the sense units of the device and shows the position of two of the sense pins of the unit immediately before a sense operation.
Figure 7:
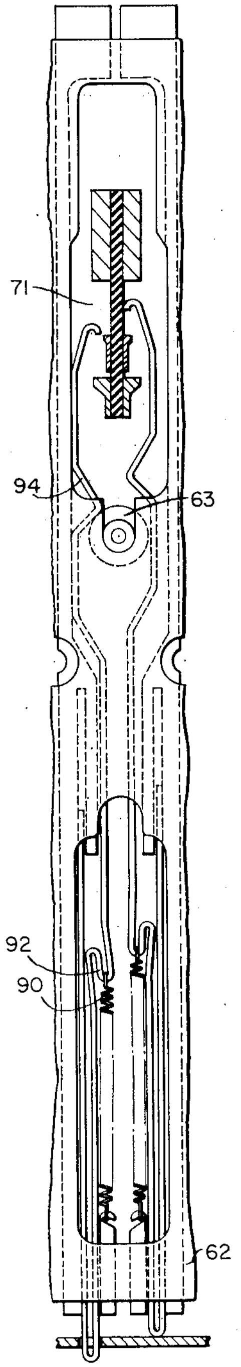
Fig. 7 is a view of the mechanism of Fig. 6 with portions broken away to facilitate illustration and shows the position of one of the sense pins in sensing a perforation and the position of ad adjacent pin in sensing a non-perforation.

When the carrier is positioned in its extreme upward position relative to the frame 43, the associated bails 72 are positioned relative to the sense units 52 as indicated in Figs. 1, 6, and 8. With the bails in this position, a hooked upper end 89 of each of the sense pins 58 latches on the associated upper or the associated lower ledge of its related bail 72. A spring 90 connected between the hook end 91 of each guide 61 and a looped portion 92 of the related sense pin 58 continually biases the sense pin downward in Figs. 2, 6, 7, and 8 to maintain its hooked end 89 engaged with the related ledge 75 or 76.

After a record card has been advanced to the sense position and is stationary, a sensing operation may be initiated by lowering the carrier 84 relative to the frame 43 in a manner to be later explained. As the carriage moves downward, the six associated bails 72, of course, also move downward towards the record card in the sense position. Each of the sense pins, which it will be remembered are latched on one of the upper or lower ledges of their related bail 72, "follows" the downward movement of its related bail under the urging of the associated spring 90. If there is no perforation in the record at a particular position, the lower end of the related sensing pin engages the record card and further downward movement of the pin is prevented as indicated for the right hand pin in Fig. 7. If a hole is punched in the record at a sensed position, however, the lower end of the related sense pin passes through the hole in the record and into an aligned opening 93 in the previously mentioned support member 19. As a pin 52 moves through the perforation in the record, a crimped portion 94 of the pin engages the surface 64 of its related bushing 63 and cams the hooked end 89 of the sensing pin outwardly beyond the vertical plane of the upper ledge 75 of the related bail and into alignment with the vertical plane of the lower ledge 76 of the bail, as indicated for the left hand pin 58 in Fig. 7.

As the bails 72 restore upwardly, the hooked end 89 of a pin which sensed a perforation now latches on the related lower ledge 76 as indicated for the left hand pin in Fig. 8, while the hooked end of a pin which did not sense a perforation is latched on the related upper ledge 75 as indicated for the right hand pin in Fig. 8. The latching of a sense pin on the lower ledge 76 signifies the previous sensing of a perforation in the record at the index position by preparing a readout circuit which is later completed from a circuit connector secured to the upper end of the guide 60, through the guide 60, through the portion 96 of the sense pin which electrically engages the contact member 60 as indicated, thence through the upper hooked end 89 of the sense pin to the lower ledge 76 which is connected to a circuit connector. The lower ledge 76 on which are latched the sense pins which sensed perforations in the "12" index position of the record card is further designated as the "12" ledge, the lower ledge 76 on which are latched the "11" sense pins is further designated as the "11" ledges, and the remaining ten lower ledges are similarly identified (see Fig. 9).

It will be noted in Fig. 8 that after the bails 72 are completely restored upward, the sense pins 58 still retain a position thereon indicative of whether they sensed a perforation or no perforation. This indication is no longer dependent upon the sensed card which can then be ejected from the sense position. The pattern of the perforation in a record card is retained in the displaced position of the related sensing pins until the bail carrier 84 again moves downward to initiate another sense operation. The sensing movement of the carrier is controlled by an electro-magnet in a manner to be explained so that after a sense operation is performed, the device retains or stores the sense information until the electro-magnet is again energized to effect a sensing of another record card then positioned in the sense station.

The mechanism provided for reciprocating the bail carrier 84 on the stationary frame 43 is most clearly shown in Figs. 1 and 2. Slidably supported in a suitable slot cut in the extension 80 on the end plates 81 of the carrier is a rod 97 having a member 98 rigidly secured thereto. Rollers 99 mounted on the outer face of each of the end plates 81 of the carrier engage the upper surface of the member 98 to positively maintain the rod 97 in its mounting slots and yet permit longitudinal movement of the rod 97 and associated member 98. Extending directly under and parallel with each of the rods 97 is a shaft 100 which is journalled in the extending portions 101 and 102 of the front and rear members 44 and 45 of the stationary frame 43. Secured to the rearward end of each of the shafts 100 is a bevel gear 103 which meshes a related bevel gear 104 secured to the main power shaft 20, the latter being journalled in support members 105 and 107 secured to the rear member 45 of the stationary frame. As previously explained, the shaft 20 is continuously rotated clockwise in Fig. 2 by any suitable drive means (not shown) and thus effects a continuous rotation of the shafts 100. Secured to each of the shafts 100 are two cams 108, each of the cams being adapted to be engaged by a related roller 109 rotatably mounted on the adjacent rod 97 by suitable bearings.

Each of the rollers 109 engages a groove cut in a related semi-circular shaped guide member 110 (see Fig. 4 or 5) which is pivotally attached at its center by stud 111 to a looped end portion 112 of the related member 98. A stud 118 secured to an extension 113 (see Figs. 4 and 5) of each guide member 110 pivotally engages a mating opening in a related link 114. The bearing mounting of each of the rollers 109 permits the roller to be displaced angularly relative to the longitudinal axis of the rod 97 for a purpose that will be later evident. One end of each of the links 114 is pivotally attached to an arm of a bellcrank 115 which is pivotally mounted on a stud carried by the previously mentioned extending portion 101 or 102 of the front member 44 of the stationary frame. The other end of each of the links 114 is pivotally attached to one end of a related lever 116 which is pivotally mounted on the previously mentioned extending portion 101 or 102 of the rear member 45 of the stationary frame. The other end of each of the levers 116 has a slotted flange 117 engaging an end of a rod 119 carried by the upper end of a cam follower 120, the latter being pivotally mounted at its lower end to a bracket 121 secured to the rear member 45 of the stationary frame as indicated in Fig. 2. The follower 120 carries a roller 122 which is adapted to engage a cam 123 secured to the main power shaft 20. A spring 125 connected between the two bellcranks 115 and acting through the links 114 tends to rotate the levers 116 so as to maintain the roller 122 of cam follower 120 engaging the cam 123.

Secured to the bracket 121 is an electro-magnet 126 having an armature 127 which pivots about point 128 of a yoke 129. A spring 131 connected between the armature and a bracket 132 secured to the yoke, normally urges the armature free of the magnet core. With the magnet deenergized, fingers 134 secured to the yoke limit the armature to a normal position as indicated in Fig. 2. With the armature in this position, its end is engaged by a latch member 135 which is pivotally mounted on the cam follower 120 by means of shaft 137. A spring 138 acting between the latch and a rib 139 of the cam follower biases the latch clockwise in Fig. 2 so as to maintain the projecting portion 140 of the latch engaging the end of an adjustable abutment screw 141 carried by the rib 139 of the cam follower.

Figure 5:
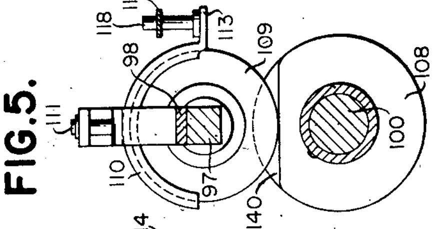
Fig. 5 is a view of the mechanism in Fig. 4 when the carrier occupies its extreme lower or sense position.
Figure 4:
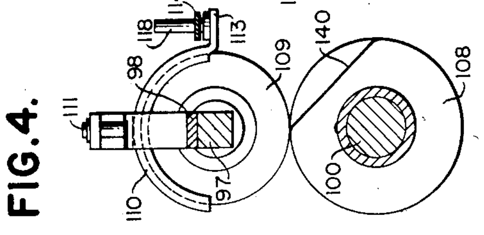
Fig. 4 is a partial vertical section taken on the plane of the line 4—4 of Fig. 1 and shows the bail carrier operating mechanism immediately before the carrier is moved from its extreme upward to its lower or sense position.

With the magnet 126 deenergized, the armature 127 engages the latch 135 as indicated in Fig. 2 to prevent the roller 122 from following the low dwell of the cam 123, and thus prevents the follower 120 from rotating counterclockwise from the position indicated. With the follower in the position shown in Figs. 1 and 2, the operatively connected levers 116, links 114 and bellcranks 115 are positioned as indicated. The position of the links 114 controls the position of the pivotally connected roller guides 110, which in turn control the position of each of the related rollers 109 relative to its related cam 108. As a result, with the links 114 positioned as indicated in Figs. 1 and 2, each of the rollers 109 will ride on the rearward surface of the related cam 108. This rearward surface is circular as indicated in Figs. 4 and 5, and, with the rollers 109 engaging these surfaces, the bail carrier is held against vertical displacement. The carrier, therefore, remains in its extreme upward position relative to the stationary frame as indicated in Figs. 1, 2, and 4. To positively maintain the rollers 109 engaging their related cams 108, the bail carrier is continually biased downward by four springs 144. Each spring extends through an opening 143 in the related front member 44 or rear member 45 of the stationary frame 43, and is connected at one end to the carrier and at the other end to a stud 145 secured to the front or rear members of the stationary frame as indicated in Figs. 1 and 2. With the carrier in its extreme upward position, the associated bails 72 are positioned relative to the stationary frame as indicated and as also previously explained.

When a sense operation is desired, the magnet 126 is energized to attract the armature 127 and move it out of engagement with the latch 135 of the cam follower 120. The roller 122 is then free to follow the low dwell portion of the cam 123 and cause the follower 120 to rotate counterclockwise from the position indicated in Fig. 2. As the follower rotates, the levers 116 are rotated around their pivots 118 from the positions indicated in Fig. 1 towards the positions indicated in Fig. 3. It will be appreciated that the rotation of the levers 116 shifts the links 114 forwardly relative to the frame 43.

Figure 3:
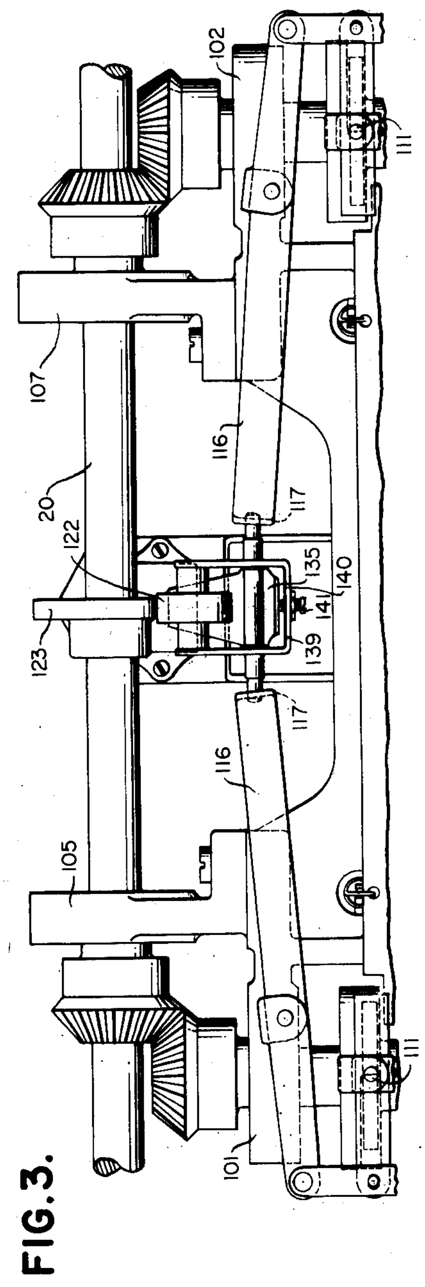
Fig. 3 is a partial plan view of the bail carrier control mechanism showing the mechanism in the position it occupies to effect a sense operation.

The first part of this forward shifting of each of the links 114 rotates the associated guide members 110 and their rollers 109 around the pivots 111 and through the maximum angle permitted by the bearing mounting of the roller 109 on the related rod 97. Thereafter, further forward movement of each link 114, slides the entire assembly of the rod 97, associated rollers 109 and guide members 110 forward relative to the carriage. This action results in the shifting of each roller from engagement with the rearward portion of its related cam 108 and into engagement with the forward portion of the cam, as indicated in Fig. 3.

The forward portion of each of the cams 108 contains a low dwell 140 as indicated in Figs. 4 and 5 and the cams are so positioned on their related mounting shafts 100 that the low dwell of all four cams are encountered simultaneously by the related rollers 109. As a result, the carrier 84 and associated bails 72 move downward relative to the stationary frame 43 and the associated sense units 52, thus effecting a sensing of a record in the sense position in the manner previously described. As each roller engages the trailing portion of the low dwell 140 of its related cam 108, the carrier and associated bails move upward relative to the stationary frame and sense units to effect the latching of the sense pins on their related bails and the removal of the lower ends of the pins from the plane of the sensed record as previously described. After the carrier 84 is again positioned in its extreme upward position, the high dwell portion of the cam 123 rotates the follower 120 clockwise in Fig. 2 so as to reengage each of the rollers 109 with the rear circumferential surface of its cam 108, as indicated in Figs. 1 and 2. The clockwise shifting of the cam follower 120 also effects the reengagement of the latch 135 with the end of the armature 127 of the now deenergized magnet 126.

As long as the magnet 126 remains unenergized, the rollers 109 continue to engage the rear portions of the cams 108 and maintain the carriage in its extreme upward position so as to retain or store the sensed perforated record data in the sense pins latched on the lower ledges 76 of their related bails 72. Upon the reenergization of the magnet 126, the sense operation as described above is repeated.

*Circuits*

Figure 9:
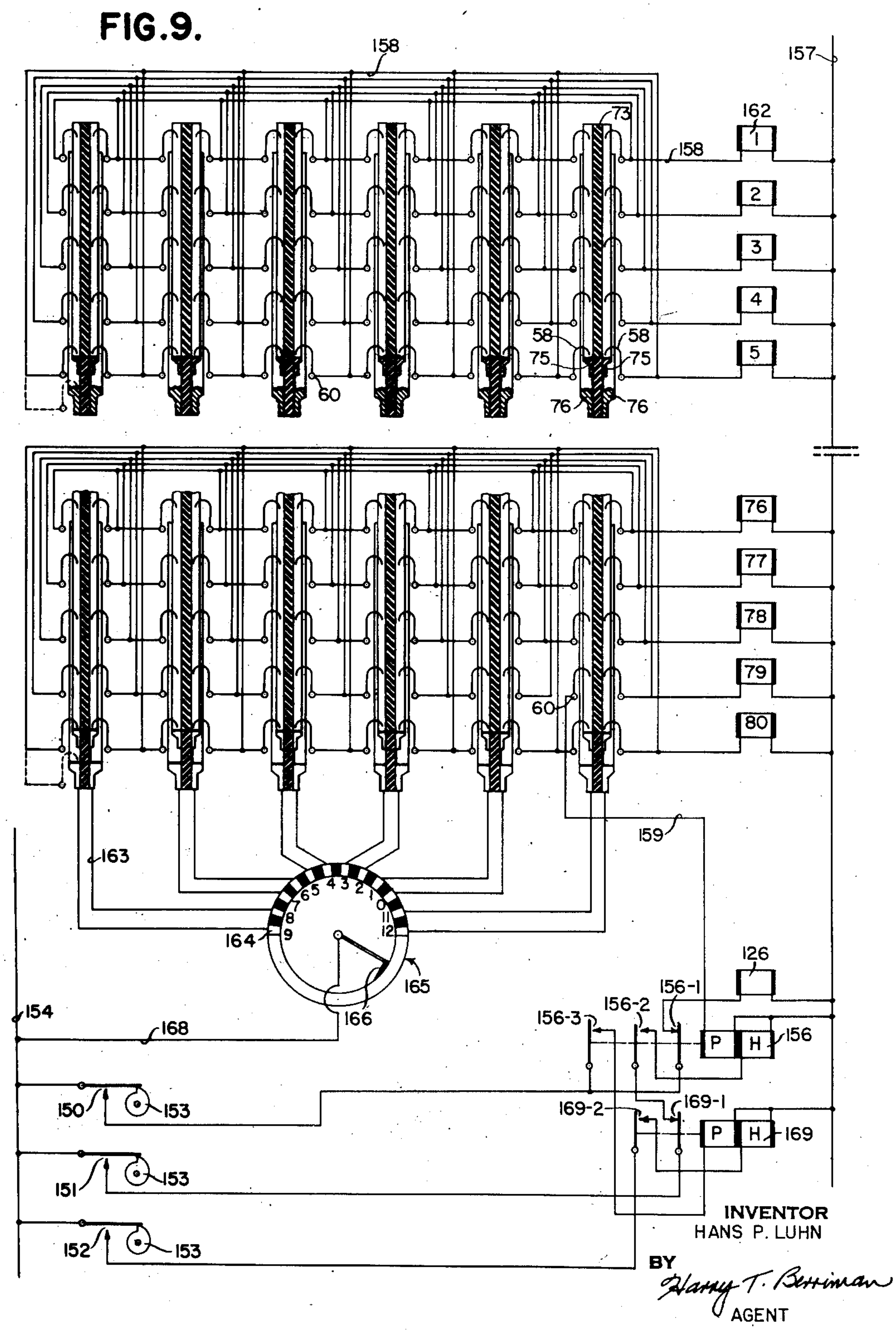
Fig. 9 is a circuit diagram.

Referring to Fig. 9, there is shown in diagrammatic form a circuit for controlling the operation of the sensing and storage device and for effecting electrical readout therefrom in order to control the operation of suitable work devices. Each of the contacts 150, 151, and 152 shown in Fig. 9 are closed during a definite time interval of each cycle by a related cam 153 which is operatively connected to the main power shaft 20 by suitable mechanism (not shown). The purpose of each of the contacts 150, 151, and 152 will be later evident.

Figure 10:
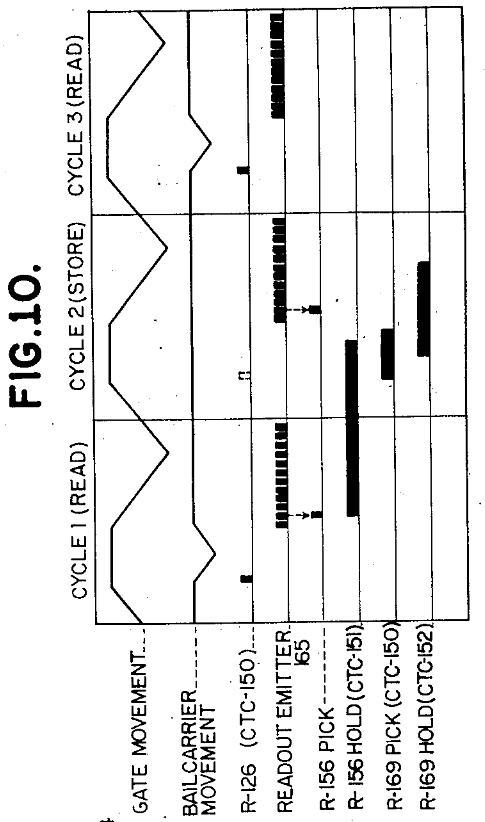
Fig. 10 is an electrical and mechanical timing chart.

It will be remembered that the gate 28 is adapted to temporarily arrest the movement of each successive record as it passes through the sense device. The gate movement is so timed, as indicated in Fig. 10, that a record is stationary in the sense position during a definite portion of each machine cycle. Each cycle shortly after a record is stationary in the sense position, the closing of cam contact 150 (see Fig. 9) normally completes a circuit from a power line 154, through the contact 150, through a normally closed point 156—1 of a relay 156, through the bail carrier control magnet 126, to a power line 157. The resultant energization of the magnet 126 effects a reciprocation of the bail carrier 84 which, in turn, effects a sensing of the record in the sense position as previously explained. After the bail carrier restores to its extreme upward position upon the completion of the actual sense operation on the card, electrical readout of the perforated data information now represented in the sense pins latched on the lower ledge 76 of their related bail 72 may be effected in the following manner.

Referring to Fig. 9, it will be noted that the upper ends of each of the guide members 60 of a sense unit are electrically connected to a common conductor 158, except for the guide 60 of the "11" pin of the 79th sense unit, the latter guide being connected through a separate conductor 159, a pick-up coil of the relay 156, to the power line 157 for a purpose that will be later evident. Each conductor 158 is connected to one terminal of a related electro-magnet 162, another terminal of the magnet being connected to the power line 157. The magnets 162 may be the control magnets for an accumulator, or magnets which control the setting of a printing device, in a way well known to those acquainted with the art.

Each lower ledge 76 of a bail 72 is connected by a conductor 163 to a corresponding stationary contact segment 164 of an emitter 165. Thus, the lower ledge 76 for the pins cooperating with the No. 12 index points is connected to the "12" segment 164, the "11" lower ledge 76 is connected to the "11" segment 164, etc. A wiper 166 of the emitter is connected through a conductor 168 to the power line 154 and is rotated counterclockwise in Fig. 9 through suitable mechanism (not shown) linking it to the main power shaft 20. The wiper is timed so as to successively engage each of the segments 164 during the latter portion of each machine cycle as indicated in Fig. 10.

It will be appreciated that as the wiper successively engages the emitter segments 164, the lower ledges 76 of the bails 72 are, in effect, successively connected to the power line 154. When each lower ledge is so connected to the power line, a circuit is completed from that ledge, through any sense pin latched therein as a result of having sensed a perforation in the corresponding index position of its related column of the record, through the associated guide member 60, through the corresponding conductor 158 and magnet 162 to the power line 157. Each magnet 162 is, therefore, subjected to a differentially timed pulse or pulses during the readout portion of the cycle as determined by which sense pin or pins 50 of the sense unit are latched on the lower ledge 76 of their bail 72. The differentially timed pulse or pulses applied to each control magnet 162 effects the operation of the associated accumulator or print device (not shown) in a way well known to those acquainted with the art.

In order to better illustrate the storage principal of the device, the circuit shown in Fig. 9 is designed so that if a so-called "X" card having a perforation in the 11 or "X" index point position of record column 79 is sensed during one cycle, the bail carrier magnet 126 cannot be energized during the following cycle. As a result, the perforated data information stored in the device as a result of the sensing of the "X" card will not only be read out during the readout portion of the cycle in which the card was sensed, but the perforated data will be retained or stored in the device so that it is again read out during the next cycle. During the cycle thereafter, the bail control magnet is again energized and a sense and readout operation is effected in the normal manner.

The above type of operation is effected as follows: Assume that a first record card having an X punch in column 79 is positioned in the sense position and the next few following records are conventional cards (no perforation in the 11 or "X" index position of column 79). After the X card has been advanced into the sense position and is stationary therein, the closing of cam contact 150 during the first part of cycle 1 (see Figs. 9 and 10) energizes the bail carrier control magnet 126 through the relay 156—1 normally closed point in the manner previously explained. As a result, the bail carrier 84 is reciprocated during the first cycle to effect a sensing of the record in the sense position. Thereafter, the wiper 166 successively engages the segments 164 to effect readout of the perforated data information to the magnets 162 in the manner previously explained. However, as the wiper 166 engages the "11" segment 164 thus reading out the "11" sense pins of the sense units in the normal manner, a circuit is also completed from the line 154, through the wiper 166, through the "11" segment 164, through the associated conductor 163 to the lower ledge 76 of the related bail 72, through the "11" sense pin of the 79th sense unit, through the associated guide 60 which it will be remembered is not electrically commoned to its fellow guide members as in the other sense units, through the conductor 159, through the pickup coil of relay 156, to the power line 157.

The resultant energization of relay 156 causes its associated 156—1 normally closed contact point to open, its 156—2 normally open contact point to close, and its 156—3 normally open contact point to close. The closing of the 156—2 contact point completes a circuit from the power line 154, through cam contact 151 now closed, through a 169—1 normally closed contact point of a relay 169, through a hold coil of relay 156, to the power line 157. Relay 156 will be held energized through cam contact 151 until after cam contact 150 closes and opens in the second cycle. As a result, the closing of cam contact 150 during the second cycle does not effect the energization of relay 126 as the series connected contact point 156—1 is still open at this time. With bail carrier magnet 126 unenergized, the bail carrier remains in its extreme upward position during cycle 2, thus preventing the sensing of the record card then in the sense position. As a result, the perforated data information represented in the device as a result of the sense operation in the first cycle is retained throughout the second cycle.

Although the closing of cam contact 150 in the second cycle does not complete a circuit to the bail carrier control magnet, it does complete a circuit from the power line 154, through the cam contact 150, through relay contact point 156—3, still closed at this time, through a pick-up coil of relay 169, to the line 157. The resultant energization of relay 169 causes its associated normally closed contact point 169—1 to open, and its normally open 169—2 point to close. The closing of the 169—2 contact point completes a circuit from the power line 154, through cam contact 152, now closed, through the 169—2 contact point, through a hold coil of relay 169, to the line 157. Relay 169 will be held energized through cam contact 152 until about the middle of the readout portion of cycle 2.

The perforated data information stored in the device is again read out as the wiper 166 sweeps over the segments 164 during the readout portion of the second cycle. As before, when the wiper is engaging the "11" segment 164 thus reading out the "11" sense pins of the sense units in the normal manner, a circuit is also completed through the "11" pin of sense unit 79 to energize the pick-up coil of relay 156. This time, however, the resultant closing of the 156—2 contact point cannot complete a circuit to the hold coil of relay 156 since the 169—1 contact point in series therewith is open as a result of relay 169 being energized. As a result, when the wiper 166 moves off the 11 segment 164, relay 156 is deenergized, thus restoring the associated 156—1 contact point to its normally closed position.

With the 156—1 contact point in its normally closed position, the closing of cam contact 150 shortly after the beginning of the third cycle, completes a circuit to energize the bail carrier magnet 126 in the same manner as in the first cycle. As a result of the energization of the magnet 126, the bail carrier is reciprocated during the first part of the third cycle thus effecting a sensing of the record card (third) then in the sense position. Thereafter, the new perforated data information is read out of the device in the same manner as previously explained. During each machine cycle thereafter, a new record card is sensed during the initial portion of the cycle and the resultant perforated data information read out of the device during the latter portion of the cycle until another record card having an X punch in column 79 is sensed. The sensing of the X card prevents the sensing of the following record and thus retains or stores the perforated data information of the X card for an extra cycle as previously explained.

It will be appreciated that the method of selectively preventing the energization of the bail control magnet through the medium of an X punch in column 79 of a record card is only illustrative, as an energization or a prevention of the energization of the magnet could be effected in any number of different ways.

By providing switching means (not shown) between the upper and lower ledges of each bail, complement numeral data could be read out of the device rather than true number data. Under these conditions, the zone index positions 12 and 11 would not be used.

While there have been shown and described and pointed out the fundamental novel features of the invention as applied to a preferred embodiment, it will be understood that various omissions and substitutions and changes in the form and details of the apparatus illustrated and its operation may be made by those skilled in the art, without departing from the spirit of the invention. It is the intention, therefore, to be limited only as indicated by the scope of the following claims.

What is claimed is:

1. A perforated record sensing and data storage device comprising, in combination, a plurality of sense pins, one for each possible perforation position of a record, means for concurrently moving said pins into engagement with a stationary perforated record, said pins being separately movable so that the ends of such pins whose related card portions are perforated will extend through the record and the ends of such pins whose related card portions are imperforate will abut and have their movement intercepted by the record; means to concurrently remove said pins from sensing said card and latch each pin in a first position if it previously engaged a perforated area of said record, or in a second position if it previously engaged a non-perforated area of said record; and means to electrically determine which of said pins are latched in said first position.

2. A device of the class described comprising, in combination, a sense pin, stationary means supporting said pin movable in a direction of its length, means for moving said pin into engagement with a related area of a record, wherein said pin extends partially through said record if said area is perforated, or wherein said pin has its movement intercepted by said record if said area is not perforated; a first device engageable with said pin if it senses a perforation for removing said pin from said record and latching it in a first position relative to said stationary supporting means, a second device engageable with said pin if it senses a non-perforation for removing it from said record and latching it in a second position relative to said stationary supporting means, and means to electrically determine if said pin is latched in said first position.

3. A device for sensing a record for a perforation and for retaining the sense information until the next sense operation comprising, in combination, a sense pin, stationary means supporting said pin movable in a direction of its length, means for moving said pin into engagement with a perforation receiving area of a record, wherein said pin will extend partially through said record if said area is perforated or wherein said pin will be intercepted by said record if said area is not perforated, a first latch device engageable with said pin if it senses a perforation, a second latch device engageable with said pin if it engages a non-perforation, means to concurrently shift said latch devices so as to remove said sense pin from said record, and means to electrically determine if said pin is latched on said first latch device.

4. A perforated record sensing and data storage device comprising, in combination, a plurality of electrically conductive sense pins, one for each possible perforation position of a record, stationary means supporting each of said pins separately movable in a direction of its length and electrically insulated from its fellow pins, means for concurrently moving said pins into engagement with a stationary perforated record wherein the ends of such pins whose related card portions are perforated will extend through the record and the ends of such pins whose related card portions are imperforate will abut and have their movement intecepted by the record, means to concurrently remove said pins from sensing said card and latch each pin in a first position relative to said supporting means if it previously engaged a perforated area of said record, or in a second position relative to said supporting means if it previously engaged a non-perforated area of said record, and means to complete an electrical circuit through each of said pins latched in said first position.

5. A perforated record sensing and data storage device comprising, in combination, a plurality of electrically conductive sense pins electrically insulated from each other, one pin for each possible perforation position of a record to be sensed, latch means normally maintaining said pins in either a first or a second position above a record sense position, means to release said pins from said latch positions and concurrently move them in a direction of their length into engagement with a perforated record positioned in said record sense position, said pins being separately movable so that the ends of such pins whose related card portions are perforated will extend through the record, and the ends of such pins whose card portions are imperforate will abut and have their movement intercepted by the record; means to concurrently remove said pins from sensing said card and simultaneously latch each pin which sensed a perforation in said first latch position and each pin which sensed a non-perforation in said second latch position, and means to complete an individual electric circuit through each of said pins latched in said first position.

6. A device of the class described comprising, in combination, an electrically conductive sense pin, stationary means insulatably supporting said pin movable in a direction of its length, means for moving said pin into engagement with a related area of a stationary record card, wherein said pin extends partially through said record if said area is perforated, or wherein said pin has its movement intercepted by said record if said area is not perforated; a first latch device formed of a conductive material and engageable with said pin if it senses a perforation for removing said pin from said record and latching said pin in a first position relative to said stationary supporting means, a second latch device engageable with said pin if it senses a non-perforated area for removing said pin from said record and latching it in a second position relative to said stationary supporting means, and means to complete an electric circuit through each of said pins latched in said first position by said first latch device, said first latch device serving as a circuit common.

7. A device of the class described comprising, in combination, a longitudinally extending sense member capable of flexure at its one end, stationary means supporting said pin movable in a direction of its length and free for flexure at said one end, a first latch device engageable with said one end of the pin and adapted to latch said pin in a first position relative to said support means, a second latch device engageable with said one end of the pin and adapted to latch said pin in a second position relative to said support means, yieldable means biasing said pin in a direction of its length and normally maintaining said one end thereof engaging said first or second latch device, means for simultaneously shifting said latch devices in a direction of the longitudinal axis of said pin to engage the other end of said pin with a related area of a stationary record adjacent thereto, wherein said pin will extend partly through said record if said area is perforated, or wherein said pin will be intercepted by said record if said area is not perforated; means to simultaneously restore said latch devices to their normal position thus removing said pin from said record, cam means engageable with said pin if it senses a perforation to flex said one end into a position wherein it is engaged by said first latch device as the latch devices are restored, and means to electrically determine if said pin is latched on said first latch device.

8. In a sensing device for reading a record perforated to represent data, a set of elongated sensing members relating to one order and adapted for cooperation with a column of perforation receiving areas of the record, each of said members being formed of a resilient material at its upper end and including an integral cam surface inclined from its longitudinal axis; spring means biasing said members in a direction of their length towards the record, first and second holding means separately engageable with an upper end of each said members and normally holding said members away from said record against the action of said spring means, means for simultaneously shifting said holding means towards said record wherein said spring means urge a lower end of said members against the record, said members being separately movable wherein engagement of a member with a hole in the record enables the member to move a predetermined extent and engagement of a member with an imperforate part of the record limits the movement of the member to a lesser extent, cam means engageable with said cam surface of a member able to move said predetermined extent and adapted to flex said related upper end out of a straight line in which it is normally engaged by said second holding means and into a position to be engaged by said first holding means, means to restore said first and second holding means thus removing the members from engagement with said record, and means to complete an electrical circuit through each of said members maintained above said record by said first holding means.

9. A device for sensing a record for a perforation and for retaining the sense information until the next sense operation comprising, in combination, an electrically conductive sense pin, stationary means supporting said pin movable in a direction of its length, a bail having first and second latch surfaces engageable with an upper end of said pin, said first latch surface being formed of an electrically conductive material; yieldable means biasing said pin in a direction of its length and normally maintaining said upper end of the pin engaging either said first or second latch surface of the bail, means for lowering said bail towards a record in a stationary sense position under a lower end of said pin, wherein said lower end of the pin is engaged with said record to extend therethrough if it encounters a perforated area or to have its movement intercepted thereby if it engages a nonperforated area; a stationary cam device engageable with said sense pin if it engages a perforation to position its upper end in the path of said first latch surface, means for restoring said bail upward wherein said pin is removed from engagement with the record, and means to complete an electrical circuit through said sense pin to said first latch surface if latched thereon.

10. A device of the class described comprising, in combination, a sense pin capable of flexure at its one end and including an integral cam surface inclined from the longitudinal axis of said pin, stationary means supporting said pin movable in a direction of its length and free for flexure at said one end; a bail carrying first and second latch devices separately engageable with said one end of the pin and adapted to latch said pin in a corresponding first and second latch positions relative to said support means, yieldable means biasing said pin in a direction of its length and normally maintaining said one end thereof engaging either said first or second latch device, means for shifting said bail in a direction of the longitudinal axis of said pin to engage the other end of said pin with a related area or a stationary record adjacent thereto, wherein said pin will extend partly through said record if said area is perforated, or wherein said pin will be intercepted by said record if said area is not perforated; means to restore said bail thus removing said pin from said record, stationary cam means engageable with said integral cam surface if said pin senses a perforation for flexing said one end thereof into a position wherein it is engaged by said first latch device as the bail restores, and means to electrically determine if said pin is latched on said first latch device.

11. A device of the class described comprising, in combination, a sense wire having one hooked end, said wire being capable of flexure at said hooked end and including an integral crimped portion thereunder having a surface inclined from the longitudinal axis of said wire, stationary means insulatably supporting said wire movable in a direction of its length and free for flexure at said one end, a bail adapted for movement between a normal and a sense position relative to said support means and including upper and lower latch ledges secured thereto, said lower latch ledge extending outwardly beyond said upper latch ledge and being formed of an electrically conductive material; means biasing said wire in a direction of its length and normally maintaining said hooked end latched on either said upper or lower ledge of said bail, means for shifting said bail from said normal to said sense position to engage said wire with a related area of a stationary record adjacent thereto, wherein said wire will extend partly through said record if said area is perforated, or wherein said wire will be intercepted by said record if said area is not perforated; means to restore said bail from the sense to the normal position, thus removing said wire from said record; a cam device secured to said support means and adapted to engage said inclined surface of the wire when it senses a perforation to flex said hooked end thereof into a position to be engaged by said lower latch surface as the bail restores, and means to complete an electrical circuit through said wire when latched on said lower ledge, said lower ledge serving as a circuit common.

12. A device for sensing data indicia represented in ordinal columns of perforated code in a record, comprising, in combination, a pair of resilient sense wires for each pair of adjacent perforation receiving areas of a column, each of said wires including a hooked upper end and an integral crimped portion thereunder having a cam surface inclined from the plane of the longitudinal axis of said sense wire, stationary means supporting said pair of wires electrically insulated and mechanically spaced from each other, each of said wires being separately movable in a direction of its length relative to said supporting means and adapted for flexure at its upper end from said longitudinal axis, a bail formed of an insulating material and extending between said hooked ends of said pair of wires, said bail having spaced upper and lower latch ledges extending from each side thereof with the lower ledges being formed of an electrically conductive material, yieldable means acting on each of said wires of a pair and biasing them in a direction of their length so as to normally maintain said hooked ends thereof engaging either of said related upper or lower latch ledges of said bail, means for reciprocating said bail towards a record in a stationary sense position and then back again wherein the lower ends of said pair of sense wires are moved into engagement with the related area of said card and then removed therefrom, the engagement of a wire with a perforation permitting it to extend therethrough and the engagement of a wire with a non-perforated area intercepting said movement; a stationary common cam device arranged between each pair of wires and adapted to be engaged by said cam surface of a sense wire as it senses a perforation thus flexing the upper end thereof into the path of said related lower ledge of the bail, and means to complete an electrical circuit through each of said wires to said related lower ledge if latched thereon.

13. A device for sensing a record for a perforation and for retaining a representation of the sense information until the next sense operation comprising, in combination, a resilient sense pin, stationary means supporting said pin movable in a direction of its length and free for flexure at its upper end from its longitudinal axis, a bail having first and second latch surfaces engageable with said upper end of said pin, a carrier for said bail, said carrier being movably mounted on said stationary means and adapted for reciprocation between an upper and a lower position relative thereto, means for reciprocating said carrier between said upper and lower position, electromagnetic means for controlling said carrier reciprocating means, yieldable means biasing said pin in a direction of its length and serving to normally maintain said upper end of the pin engaging either said first or second latch surfaces of the bail, wherein as said bail carrier shifts from said upper to said lower position, a lower end of said pin is engaged with said record to extend therethrough if it finds a perforated area or to have its movement intercepted by the record if it finds a non-perforated area; a stationary cam device engageable with said sense pin if it engages a perforation to positively position its upper end in a position to be engaged by said first latch surface as the bail carrier moves from its lower to its upper position, and means to complete an electrical circuit through said sense pin if latched on said first latch surface.

14. A device for sensing data indicia represented in ordinal columns of perforated code in a record and for retaining a representation of said data information after each sense operation and until the next sense operation comprising, in combination, a record sense station, continuously operable means for advancing records successively through said sense station, a cyclically operable gate for momentarily arresting the movement of each record as it reaches the sense station, a sense unit for each record column, a plurality of electrically conductive sense pins carried by each sense unit, one sense pin for each possible perforation position of a column, each sense pin being separately movable in a direction of its length and so constructed as to permit flexure of an upper end thereof out of a straight line; stationary frame means rigidly supporting each sense unit positioned above a related column of a record in said sense station, a plurality of bails, each of said bails being positioned between the upper ends of a definite pair of adjacent sense pins of each sense unit and extending between the upper ends of corresponding pairs of sense pins of the remaining sense units of the device, upper and lower latch ledges secured to and extending outwardly from each side of said bail and separately adapted for cooperation with said upper end of the associated sense pins, said lower ledge extending outwardly beyond said upper ledge and being formed of an electrically conductive material; a carrier for said bails, said carrier being movably mounted on said frame and adapted for reciprocation between an upper and a lower position on said frame, means for reciprocating said carrier between said upper and lower position on said frame, means including an electromagnetic device for controlling said carrier reciprocating means, spring members biasing each pin of a unit in a direction of its length and serving to normally maintain said upper end of each pin positively engaging said upper or lower latch ledge of the related bail, wherein as said bail carrier moves from said upper to said lower position, a lower end of each said pin is engaged with said record to extend therethrough if it finds a perforated area, or to have its movement intercepted thereby if it finds a non-perforated area; a plurality of stationary cam devices forming part of each sense unit, each cam device being positioned between said adjacent pairs of sense pins of a sense unit and adapted to be engaged by each said related sense pin if it engages a perforation to positively displace its upper end into a position to be engaged by said lower ledge of its related bail as the bail carrier moves from said lower to said upper position, and means to complete an electrical circuit through each said sense pin to said related lower latch ledge if latched thereon.

15. A device for closing a normally open circuit contact in response to the sensing of a perforation in a record comprising, in combination, an electrically conductive sense pin forming one element of said contact, stationary means insulatably supporting said pin movable in a direction of its length, a conductive insert carried by said support means and adapted to slidably and electrically engage said pin at all times, said insert being adapted for connection to one side of an electrical circuit, means for moving said pin into engagement with a perforation receiving area of a record, wherein said pin will extend partially through said record if said area is perforated or wherein said pin will be intercepted by said record if said area is not perforated; a first latch device formed of a conductive material and engageable with said pin if it senses a perforation, said latch device serving as another element of said contact and being adapted to be connected to another side of an external circuit, a second latch device engageable with said pin if it engages a non-perforation, and means to concurrently shift said latch devices so as to remove said sense pin from said record.

HANS P. LUHN.

References Cited in the file of this patent

UNITED STATES PATENTS

| Number | Name | Date |
|---|---|---|
| 2,607,527 | Haines | Aug. 19, 1952 |